United States Patent [19]
Sellers

[11] Patent Number: 5,821,922
[45] Date of Patent: Oct. 13, 1998

[54] COMPUTER HAVING VIDEO CONTROLLED CURSOR SYSTEM

[75] Inventor: Charles A. Sellers, Houston, Tex.

[73] Assignee: Compaq Computer Corporation, Houston, Tex.

[21] Appl. No.: 863,870

[22] Filed: May 27, 1997

[51] Int. Cl.$^6$ ...................................................... G09G 5/08
[52] U.S. Cl. ........................................... 345/157; 345/168
[58] Field of Search .................................. 345/168, 157, 345/156, 173, 7, 435; 382/312

[56] References Cited

U.S. PATENT DOCUMENTS

| | | | |
|---|---|---|---|
| 4,843,568 | 6/1989 | Krueger et al. | 345/435 |
| 5,168,531 | 12/1992 | Sigel | 345/157 |
| 5,581,276 | 12/1996 | Cipolla et al. | 345/156 |
| 5,677,700 | 10/1997 | Schwalba et al. | 345/7 |

*Primary Examiner*—Xiao Wu
*Attorney, Agent, or Firm*—Konneker & Smith, P.C.

[57] ABSTRACT

A cursor control system for a computer includes a small video camera mounted above the keyboard portion of the computer and pivotable to selectively view (1) a central observation zone generally over the keyboard, (2) a horizontally offset observation zone to the left of the keyboard, or (3) a horizontally offset observation zone to the right of the keyboard. The image received by the video camera of a computer user's hand placed within the selected observation zone is transmitted to cursor control circuitry which monitors the presence, configuration and movement of the hand. When the hand is placed in a first predetermined configuration and moved into and through the zone, the circuitry switches the computer from a keyboard typing mode to a cursor positioning mode, tracks the hand movement through the zone, and correspondingly moves the cursor on the computer display screen. When the hand is then placed in a predetermined second configuration the circuitry causes a cursor "pick" function to be generated in conjunction with the repositioned cursor. Finally, in response to placement of the hand in a third predetermined configuration the circuitry switches the computer from its cursor positioning mode back to its previous keyboard typing mode. The video controlled cursor positioning system is representatively illustrated in both a portable and desktop computer embodiment.

25 Claims, 5 Drawing Sheets

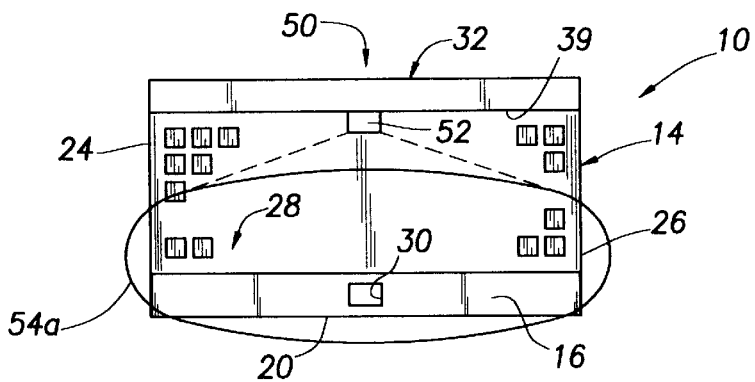
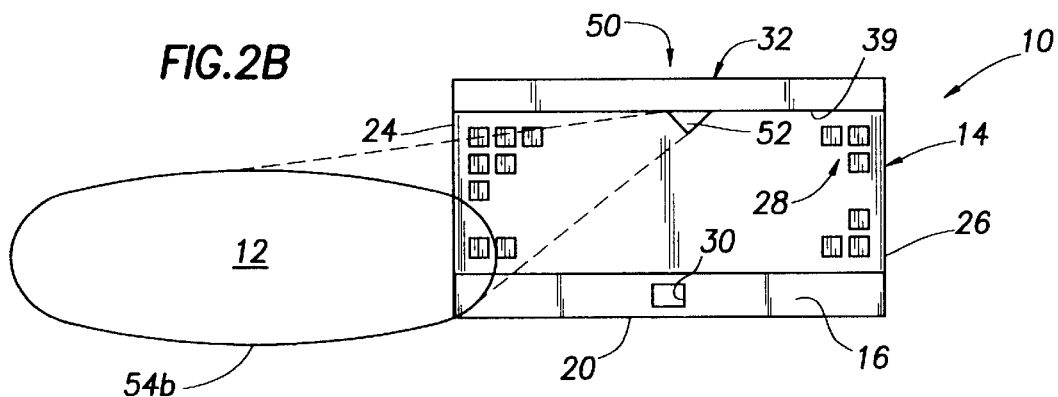
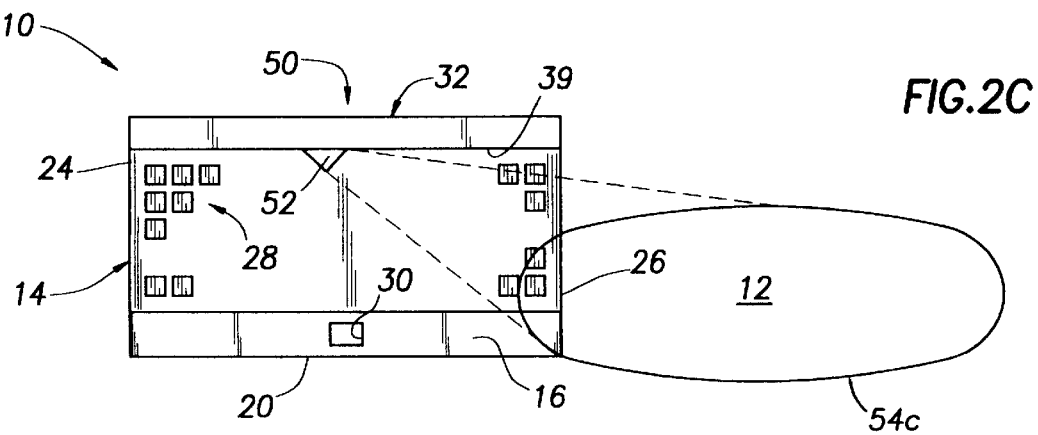

COMPUTER HAVING VIDEO CONTROLLED CURSOR SYSTEM

BACKGROUND OF THE INVENTION

1. Field of the Invention

The present invention generally relates to electronic apparatus and, in a preferred embodiment thereof, more particularly relates to cursor control systems for computers.

2. Description of Related Art

A variety of display screen cursor control systems have previously been utilized on or adjacent the keyboard portion of both desktop and portable computers. These cursor control devices include mice, trackballs, touchpads and pointing sticks.

The computer mouse is basically a small housing which has a ball on its underside that is rolled by the computer user along a horizontal support surface adjacent the keyboard in response to hand movement of the mouse housing parallel to the support surface. The sense and speed of the rotation of the mouse ball is monitored and appropriately converted to a positional output signal used to correspondingly reposition the cursor on the computer. The mouse housing typically has at least one "pick" button thereon which may be depressed to select an icon to which the cursor has been moved, or simply to select a desired screen location.

A track ball is basically an inverted mouse with the ball facing upwardly for direct manipulation by the computer user's fingers. The track ball is typically mounted on the base housing of a portable computer adjacent one or more "pick" buttons associated with the ball.

A touchpad typically has a small, generally planar rectangular surface along which the user runs his finger in the desired direction of cursor movement. A sensing structure beneath the user-engaged surface converts his finger movements to appropriate cursor movement signals. As in the case of the track ball and mouse, the touchpad is typically placed adjacent one or more manually depressible "pick" buttons.

A pointing stick is typically placed among and projects upwardly beyond a group of keyboard key cap members—typically in a generally central location of the keyboard between the user's index fingers in their "home" typing positions. Either index finger may be used to tilt the vertically oriented pointing stick in the desired direction of cursor movement, with a pressure sensing base portion of the pointing stick structure detecting the rocking movement of the stick and transforming the detected stick into corresponding cursor movement signals.

A recent potential addition to these types of cursor control devices, a two dimensional optical digitizer device, is illustrated and described in pending U.S. application Ser. No. 08/486,310, filed on Jun. 7, 1995, and pending U.S. application Ser. No. 08/651,881, filed on Jun. 4, 1996, each of such pending applications being assigned to the same assignee as this application. These digitizer devices utilize a single source of light to form a generally planar two dimensional light pattern disposed over and generally parallel to a computer keyboard. A finger placed in the light pattern interrupts a corresponding portion thereof, with the interruption location being sensed and used to transmit positional information to the display screen.

Various problems, limitations and disadvantages are typically associated with these previously proposed types of cursor control devices and systems. It is to these problems, limitations and disadvantages that the present invention is directed.

For example, the computer mouse requires a substantial amount of unobstructed desktop space adjacent the keyboard to be moved around in. Also, many computer mice are configured for right hand use, making them awkward for the left-handed user. The trackball is typically integrated into the system keyboard area in a fixed location which is usually a comprise based on where there is space in the system. Accordingly, the trackball can often be somewhat awkward to use.

The touchpad, like the trackball, is typically integrated into a fixed area of the system keyboard structure. Additionally, the touchpad typically has a relatively small surface area along which the user's finger can be moved to correspondingly move the display screen cursor. Accordingly, the touchpad tends to be rather inconvenient to use when long cursor movements are required.

The pointing stick is the smallest of the conventionally utilized cursor positioning devices and thus may be very compactly located on the keyboard structure. However, the small size of this device makes it somewhat difficult for some users to properly engage and use. Additionally, since the pointing stick is usually centrally located in the keyboard it usually must be separated a substantial distance from its associated selection buttons. This, too, is often considered undesirable by computer users. Moreover, due to the "rocking" motion that must be imparted to the pointing stick to operate it, the use of the stick is considered by many users to be at least to some degree counterintuitive.

The optical digitizers mentioned above require for the generation and maintenance of their two dimensional optical fields above and generally parallel to the keyboard a variety of reflector, interceptor and light generating members mounted in exposed orientations on the keyboard. Additionally, as a practical matter, such digitizers are designed for use in a pointing mode with at least one of the user's hands maintained over the keyboard. This, of course, would be at least somewhat undesirable to a user who prefers to reposition the display screen cursor with one of his hands positioned off the keyboard.

SUMMARY OF THE INVENTION

In carrying out principles of the present invention, in accordance with a preferred embodiment thereof, computer apparatus is provided which comprises a keyboard, a screen upon which a movable cursor may be displayed, and a video camera operable to monitor an observation zone which is preferably adjacent the keyboard. The computer apparatus also includes control circuitry which is associated with the video camera and operative in response to detection by the camera of a control movement of a predetermined object, preferably a hand of a user of the computer apparatus, through the observation zone, to move the cursor on the screen in a manner corresponding to the camera-detected control movement.

According to another feature of the invention, the control circuitry is also operative to detect a change in configuration in the user's hand and vary a cursor control output signal in accordance with the detected hand configurational change. In a preferred embodiment thereof the control circuitry is operative to (1) switch the computer apparatus from a keyboard typing mode to a cursor control mode when the video camera observes a hand in a first configuration within the observation zone, (2) generate a cursor "pick" signal when the video camera observes the hand in a second configuration within the observation zone, and (3) switch the computer apparatus from the cursor control mode back to the keyboard typing mode when the video camera observes the hand in a third configuration within the observation zone or detects the withdrawal of the hand from the observation zone.

In one illustrated version thereof, the computer apparatus is a portable computer having a base housing upon which the keyboard is mounted, and a lid housing, upon which the screen is carried, the lid housing being movable relative to the base housing between open and closed positions. The video camera is carried on a front or inner side of the lid housing for use when the lid housing is opened and is representatively pivotable relative to the lid housing selectively among (1) a central position in which the camera observation zone is disposed generally above the base housing, (2) a left position in which the camera observation zone is horizontally offset leftwardly from the base housing, and (3) a right position in which the camera observation zone is horizontally offset rightwardly from the base housing.

In a second illustrated computer apparatus version the keyboard is the separate keyboard portion of a desktop computer system having a monitor display screen remote from the keyboard portion. The video camera is pivotally supported in an elevated position relative to the desktop keyboard by a vertical support member extending upwardly from a rear side of the keyboard. The camera may be pivotally adjusted to monitor central, left and right observation zones respectively disposed above the keyboard, to the left of the keyboard, and to the right of the keyboard.

BRIEF DESCRIPTION OF THE DRAWINGS

FIGS. 2A–2C are reduced scale simplified top plan views of the portable computer and respectively illustrate its available video camera-monitored central, left and right cursor control hand observation zones;

DETAILED DESCRIPTION

Figure 1:
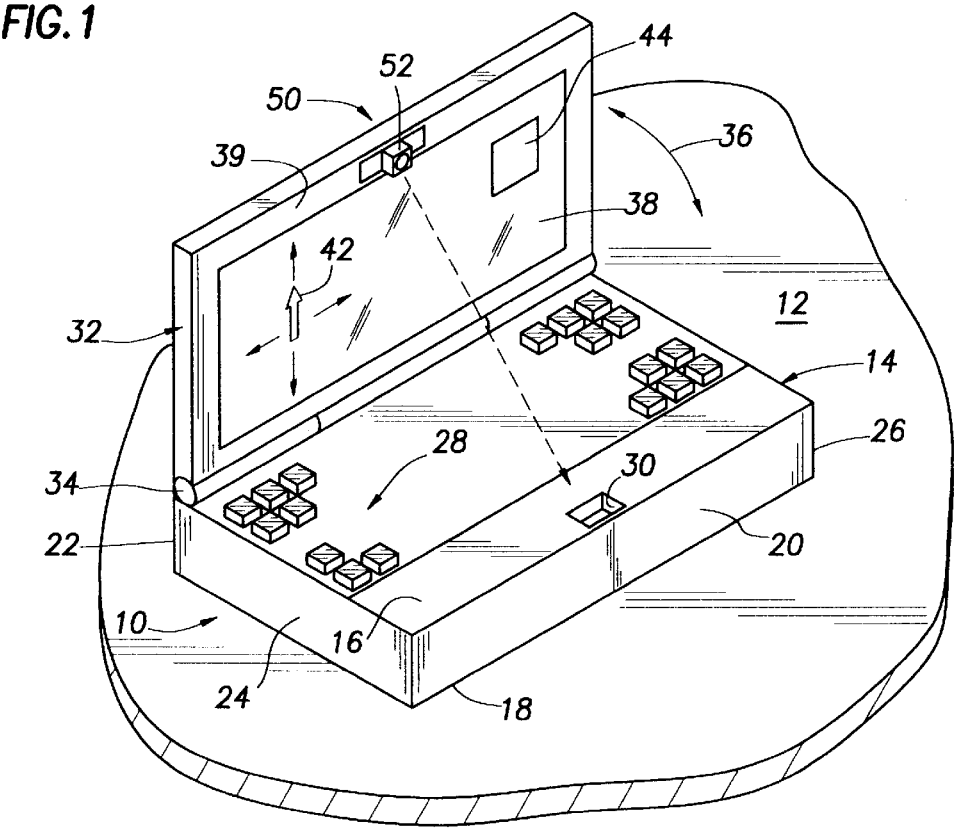
FIG. 1 is a simplified perspective view of a representative portable computer incorporating therein a specially designed video controlled cursor system embodying principles of the present invention.

Perspectively illustrated in simplified form in FIG. 1 is a representative portable notebook computer 10 which incorporates therein a specially designed video controlled cursor system which embodies principles of the present invention and is subsequently described in detail herein. The portable computer 10 is shown resting atop a suitable horizontal support surface, such as a desktop 12, and includes a rectangular base housing 14 having top and bottom sides 16 and 18, front and rear sides 20 and 22, and left and right ends 24 and 26. A keyboard assembly 28 is mounted on a rear portion of the top side 16. For reasons later described herein, a central rectangular recess 30 is formed in the top side 16 of the base housing 14 in front of the keyboard assembly 28.

In addition to the base housing 14 the computer 10 also includes a somewhat thinner rectangular lid housing 32 which is hinge-secured, as at 34, to a rear top side portion of the base housing 14 for pivotal movement relative thereto (as indicated by the double-ended arrow 36 in FIG. 1) between a generally upright open use orientation (shown in FIG. 1) in which the lid housing 32 exposes the keyboard 28, and a downwardly tilted closed storage and transport orientation in which the lid housing 32 extends across and parallel to the top base housing side 16 and covers the keyboard 28. Suitable latch means (not shown) are provided for releasably locking the lid housing 32 in this closed storage and transport orientation thereof.

Lid housing 32 has a rectangular display screen 38 mounted on the front or inner side 39 thereof, the display screen 38 facing forwardly and being exposed to user view, as shown in FIG. 1, when the lid housing 32 is in its open use orientation. The computer 10 is provided with display screen circuitry 40 (see FIG. 3) which is operative to display on the screen 38 a cursor 42 and a selectable icon 44. As later described herein, cursor control circuitry 46 (see FIG. 3) may be operated to selectively move the cursor 42 upwardly, downwardly, leftwardly and rightwardly along the display screen 38 as indicated by the movement arrows adjacent the cursor 42 in FIG. 1.

Figure 3:
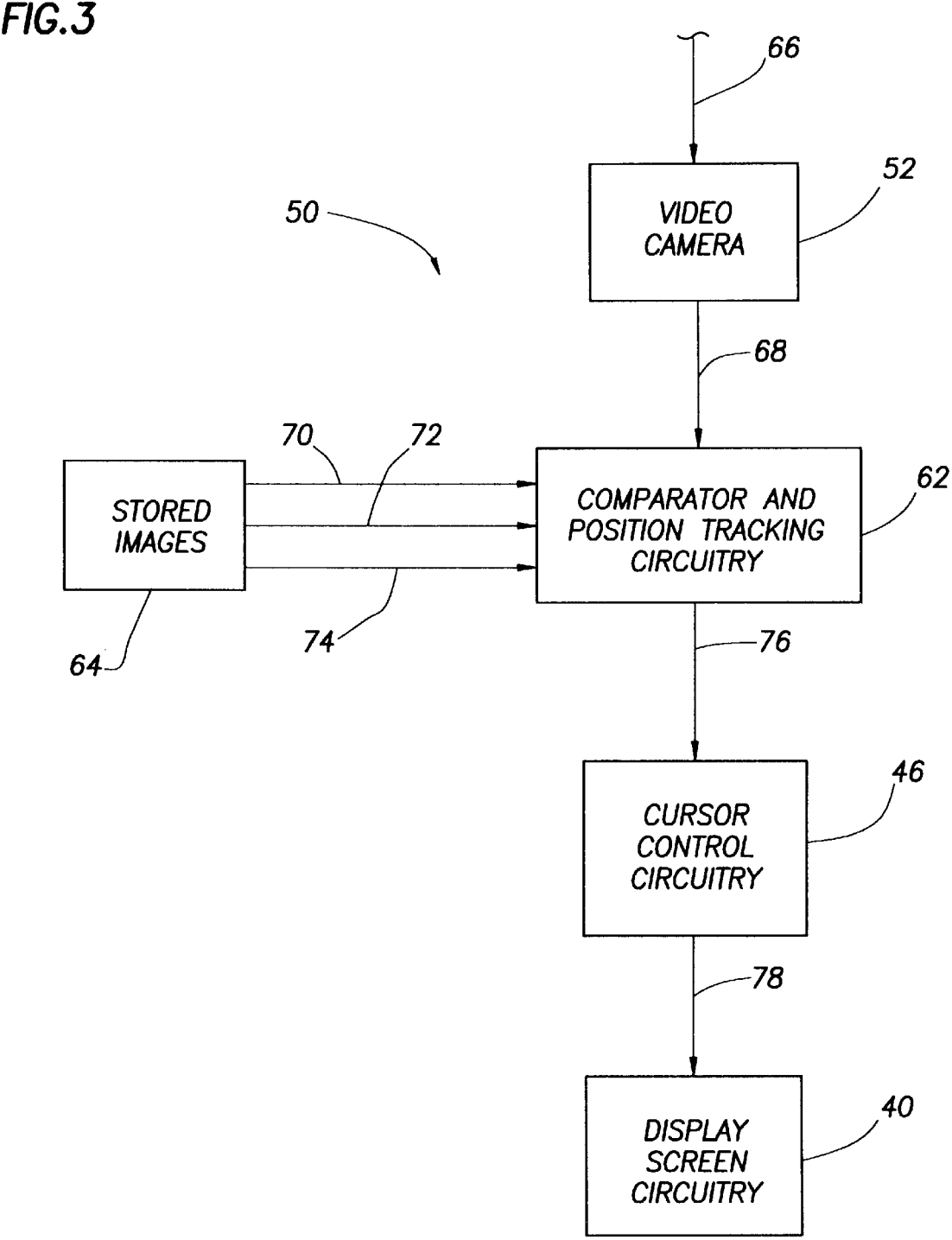
FIG. 3 is a simplified, highly schematic block diagram of the computer circuitry in the cursor control system.

Referring now to FIGS. 1–3, the video controlled cursor system 50 includes a small video camera 52 centrally mounted on and projecting outwardly from a top portion of the lid housing front side 39 above the top edge of the display screen 38. When the lid housing 32 is closed, the outwardly projecting video camera is protectively received in the base housing top side recess 30. Video camera 52 is supported on the lid housing 32 for horizontal pivotal motion relative thereto to a selectively variable one of three positions—(1) a central position, shown in FIGS. 1 and 2A, in which the video camera 52 monitors a central observation zone 54a disposed over a front top side portion of the base housing 14 (see FIG. 2A); (2) a leftwardly pivoted position, shown in FIG. 2B, in which the video camera 52 monitors a left observation zone 54b disposed over the desktop 12 immediately to the left of the base housing 14; and (3) a rightwardly pivoted position, shown in FIG. 2C, in which the video camera 52 monitors a right observation zone 54c disposed over the desktop 12 immediately to the right of the base housing 14.

The selected camera-monitored observation zone is used as a cursor control area into which one of the computer user's hands may be inserted and manipulated to correspondingly regulate the movement of the cursor 42 on the display screen 38. In a manner subsequently described herein, the video controlled cursor system 50 is operative to detect the presence, configuration and movement of the user's hand to switch the computer between a keyboard typing mode and a cursor control mode, move the cursor around on the display screen, and carry out a cursor "pick" function when the cursor is appropriately repositioned on the display screen in response to the camera-sensed hand manipulations within the chosen observation zone.

Figure 4:
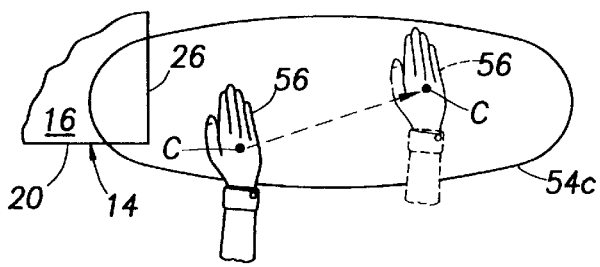
FIGS. 4, 4A and 4B are schematic top plan views of the right cursor control hand observation zone and illustrate a user's hand positioned therein and being used in three different configurations to respectively move the computer's display screen cursor, execute a cursor "pick" function, and return the computer from a cursor positioning mode to a keyboard typing mode.
Figure 5:
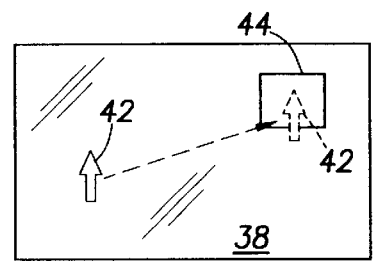
FIGS. 5 and 5A are schematic illustrations of the computer display screen and respectively illustrate the cursor operation resulting from the user hand movement shown in FIG. 4, and the cursor "pick" function obtained by reconfiguring of the user's hand as shown in FIG. 4A.
Figure 4A:
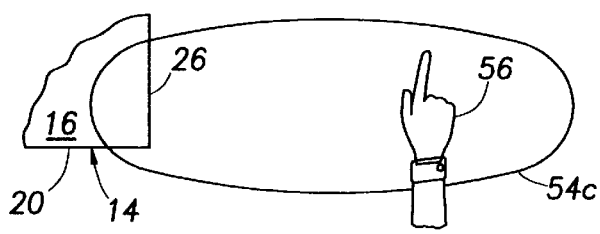
Figure 5A:
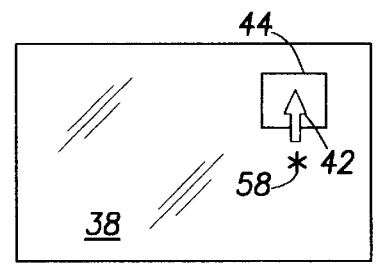

The basic operation of the video controlled cursor system 50 is illustrated in simplified pictorial form in FIGS. 4–5A in which the right observation zone 54c is representatively being utilized. To move the cursor 42 upwardly and to the right on the display screen 38, the user moves his right hand 56 (in its flattened, palm down configuration shown in FIG. 4) into the observation zone 54c to the solid line hand position. As later described, the system 50 detects the flattened hand configuration, and determines the location of the centroid C of the hand, and responsively switches the computer from a keyboard typing mode to a cursor positioning mode.

Next, the user moves his hand 56 rearwardly and to the right, to its dotted line position shown in FIG. 4. The system 50 tracks the movement of the hand centroid C and correspondingly moves the cursor 42 from its solid line position on the display screen 38 in FIG. 5 to its upwardly and rightwardly shifted dotted line position—representatively within the selectable icon 44.

After the user repositions the cursor in this manner, using his hand in a first configuration as shown in FIG. 4, he manipulates his hand 56 within the observation zone 54c to a second configuration—representatively, a closed position with the index finger extended—which represents a cursor "pick" signal. The system 50 recognizes this second hand configuration and responsively causes the repositioned cursor 42 to "pick" or select the icon 44 as indicated by the asterisk 58 in FIG. 5A.

Finally, after the icon 44 has been cursor-selected, the user manipulates his hand 56 to a third, representatively fist-shaped configuration which is a "switch to keyboard typing mode" signal. The system 50, upon detecting this third hand configuration within the right observation zone 54c, switches the computer from the previously activated cursor control mode back to its original keyboard typing mode, and the user withdraws his hand 56 from the observation zone 54c as indicated by the arrow 60 in FIG. 4B. The withdrawn hand may be then be returned to its typing position over the keyboard 28.

Figure 4B:
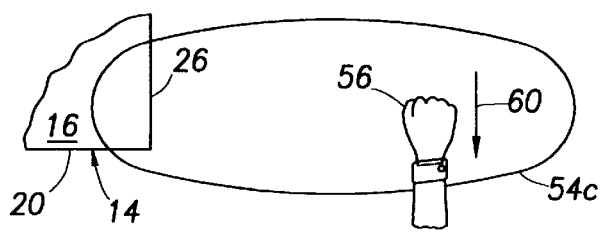

It will be appreciated that the three hand configurations shown in FIGS. 4–4B are merely representative of many alternate hand configurations that could be used to perform the illustrated cursor control functions. Many other hand configurations could be used in place of those illustrated. Additionally, it will also be appreciated that, depending on the user's preference, either of the other two observation zones 54a,54b could be used instead of the right observation zone 54c if desired. Moreover, while it is particularly convenient for the user to utilize his hand in the selected observation zone to manipulate the cursor 42, another suitable movable and reconfigurable object could be used in place of the user's hand if necessary or desired.

Turning now to FIG. 3, in addition to the previously mentioned display screen circuitry 40, the cursor control circuitry 46 and the video camera 52, the video controlled cursor system 50 also includes comparator and position tracking circuitry 62 and reference image storage circuitry 64. Data indicative of the three representative hand configurations are appropriately stored in the circuitry 64.

In general, system 50 operates as follows. During operation of the system 50, upon receiving an image 66 of the user's hand 56 within the selected observation zone 54a,54b or 54c the video camera 52 transmits to the comparator and position tracking circuitry 62 an output signal 68 indicative of the received image 66, and of any movement of the hand within the observation zone, while the circuitry 62 is also receiving output signals 70,72 and 74 from the reference image storage circuitry 64. Signals 70,72 and 74 are respectively indicative of the stored first, second and third hand configuration images in the circuitry 64.

The comparator and position tracking circuitry 62 compares the camera-generated signal 68 to the stored hand configuration image signals 70,72 and 74 and, if the signal 68 matches any of the signals 70,72 and 74, transmits to the cursor control circuitry 46 an appropriate output signal 76 that, in effect, instructs the cursor control circuitry as to what cursor movement and/or action is required in conjunction with the detected hand configuration and/or hand movement within the selected observation zone. In response to the receipt of the signal 76, the cursor control circuitry 46 outputs a corresponding signal 78 to the display screen circuitry 40 which, in turn, carries out the cursor movement and/or function.

Figure 6:
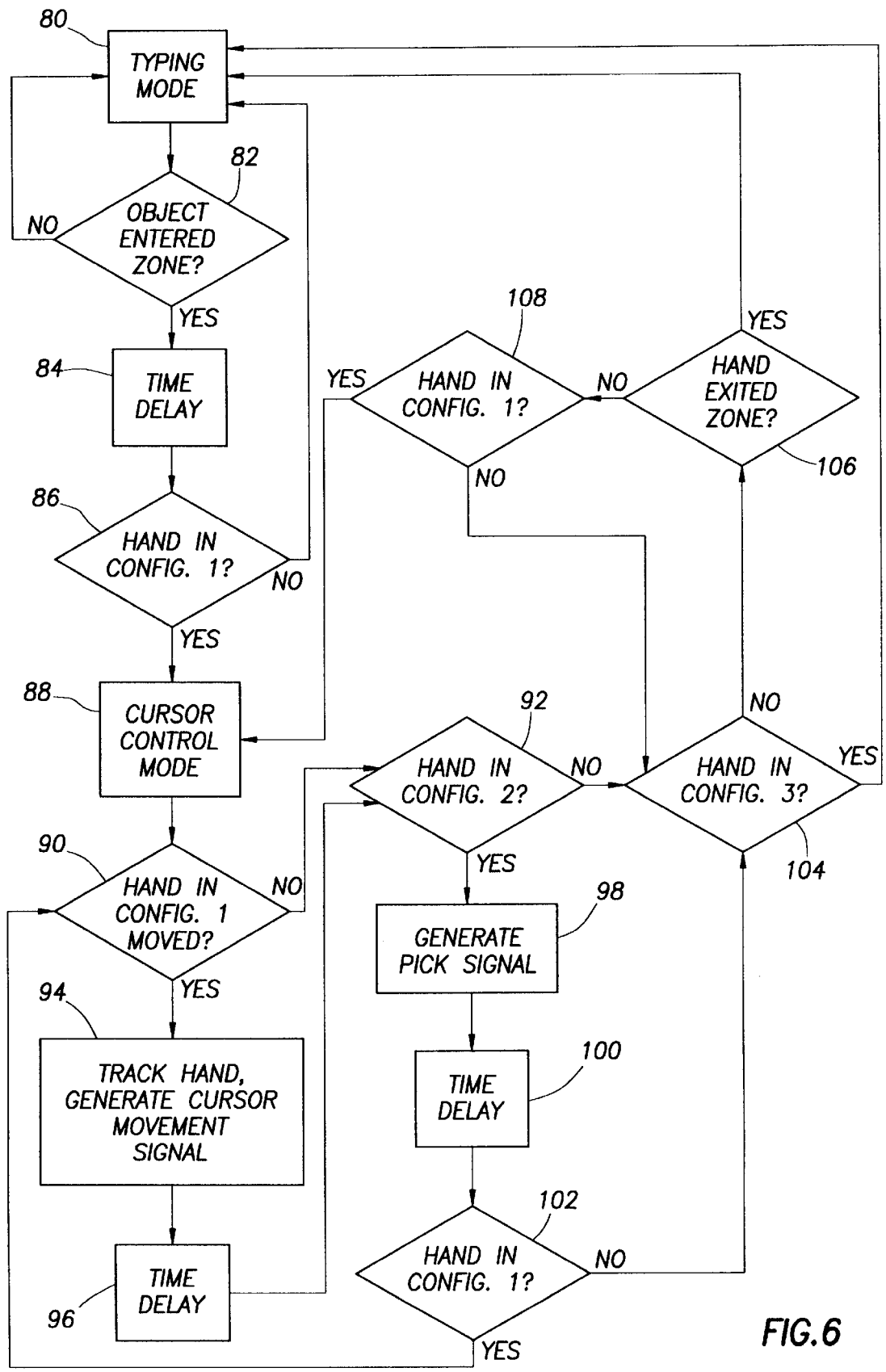
FIG. 6 is a schematic flow diagram illustrating the operation of the computer circuitry in the cursor control system.

FIG. 6 is a flow chart which schematically depicts in more detail the overall operation of the cursor control system 50 which was broadly described above in conjunction with FIG. 3. As indicated in the top left corner of the flow chart, it will be assumed for purposes of illustration and explanation that the computer 10 is initially in a keyboard typing mode 80, with the system 50 continuously testing, at step 82, for the entry of an object into the selected camera observation zone. If no entering object is detected, the computer is maintained in its typing mode 80.

If at step 82 an entering object is detected a query is made at step 86, after a predetermined short time delay 84, whether the detected object entering the observation zone is a hand in the predetermined first configuration (representatively a flattened, palm-down hand as shown in FIG. 4). If the answer is yes, the computer typing mode 80 is switched off and the cursor control mode 88 is switched on. If the answer is no, the computer is maintained in its typing mode 80.

After the cursor control mode 88 has been switched on a query is made at step 90 whether the hand in the predetermined first configuration has moved. If it has not, the program moves on to step 92. If the hand has moved, the system 50, at step 94, tracks the hand movement and generates a corresponding cursor movement signal to reposition the cursor 42 on the display screen 38 as illustrated, for example, in FIG. 5. Next, after a predetermined time delay 96, the program moves on to step 92. At step 92 a query is made whether the hand has been repositioned to its second predetermined configuration (representatively with only the index finger extended). If it has, the system 50 generates a pick signal at step 98 and, after a predetermined time delay 100, queries at step 102 whether the hand has been returned to its first predetermined configuration. If the hand is now in its first configuration the program returns to step 90.

A determination at step 92 that the hand is not in its second configuration, or a determination at step 102 that the hand is not in its first configuration, causes the program to move to step 104. At step 104 a query is made whether the hand is now in its third predetermined configuration (representatively a fist configuration). If it is, the cursor control mode 88 is switched off and the computer is returned to its keyboard typing mode 80. If it is not, a query is made at step whether the hand has exited the observation zone. A determination that the hand has exited the observation zone also returns the computer to its keyboard typing mode 80.

A determination at step 106 that the hand has not exited the observation zone causes the program to transfer to step 108 in which a query is made whether the hand is in its first configuration. If the hand is in its first configuration at step 108 the program loops through steps 90, 92, 104, 106 and 108 until the hand is moved, positioned in its second or third configuration, or removed from the observation zone. A determination at step 108 that the hand is not in its first configuration causes the program to loop through steps 104, 106 and 108 until the hand is positioned in its first or third configurations.

As can be seen from the foregoing, the video controlled cursor system 50 provides the computer user with a great deal of flexibility in regulating the movement on the display screen 38 of the cursor 42, and the selection action associated with the cursor. The use of the video camera 52 permits the user of the computer 10 to conveniently control cursor movement from a position adjacent the keyboard 28—either upwardly adjacent the keyboard or outwardly adjacent the keyboard on its left or right side—without the necessity of placing any physical equipment on the keyboard or on the desktop area leftwardly or rightwardly adjacent the keyboard. The system 50 also quite easily accommodates both left and right handed users, and permits substantially unfettered hand movement over relatively large distances to easily handle correspondingly long cursor movement distances on the display screen.

Additionally, because the user's changing hand configurations are detected and used to provide the cursor with selection functions, the need to position "pick" buttons on or adjacent the computer base housing 14 is desirably eliminated. Moreover, the cursor control movements of the user's hand are quite intuitive and thus easy to learn and implement.

The placement of the video camera 52 at a level higher than the selected hand manipulation/observation zone provides the ability to readily discern three dimensional hand shapes, thereby giving the system 50 a degree of operational sophistication and flexibility lacking in two dimensional optical digitizing systems. Additionally, the elimination of small objects such as a diminutive pointing stick, pick buttons, a fixed location trackball and the like make the system 50 more comfortable to use than many other types of pointing systems currently being used on computers.

In addition to being used in a cursor positioning control mode, the video camera 52 can, if desired, be mounted in a manner permitting it to be upwardly pivoted to capture an image of the computer user's head and shoulders for video conferencing purposes, thus desirably achieving a dual use from the video camera.

While the video controlled cursor system 50 has thus far been representatively illustrated as being incorporated in a portable notebook computer 10, it will be readily appreciated that it can alternatively be incorporated to advantage in other types of computer systems such as a desktop computer system. An example of such incorporation of the system 50 is illustrated in FIG. 7 in which the system 50 is used in conjunction with the separate keyboard portion 110 of a desktop computer system having a display monitor 38a upon which a movable cursor 42a and a selectable icon 44a may be generated.

Figure 7:
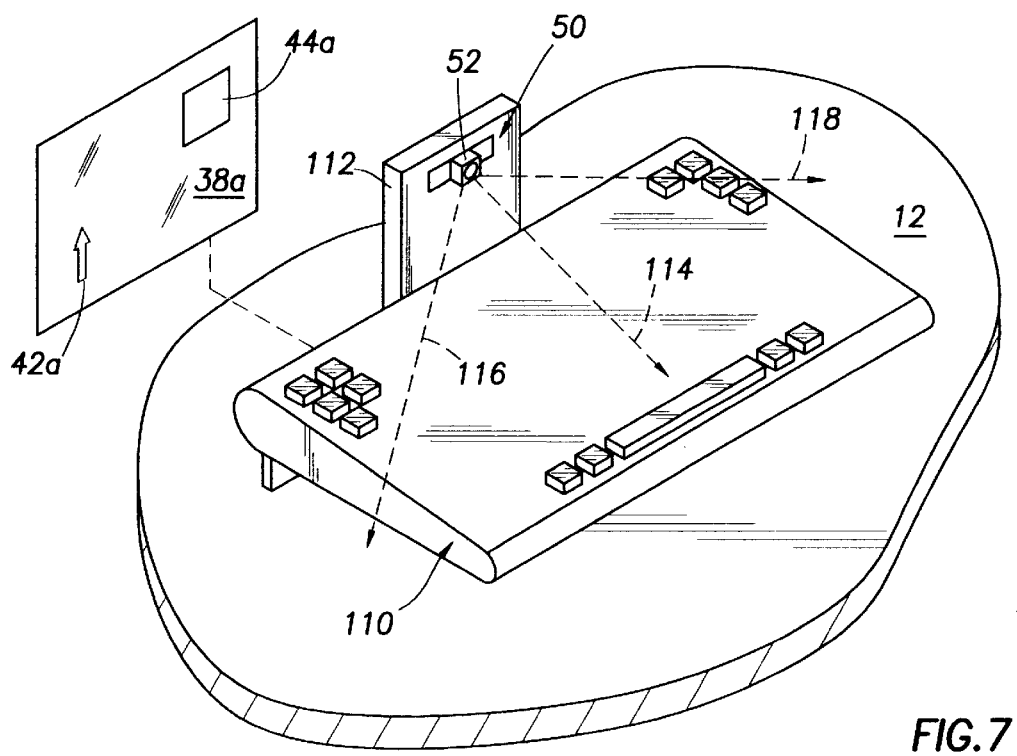
FIG. 7 is a simplified perspective view of a representative alternate mounting of the video camera portion of the cursor control system on a desktop computer system keyboard.

In this application the pivotable video camera 52 is mounted on a suitable vertical support structure 112 centrally secured to a rear side of the keyboard 110 and holding the video camera 52 in an elevated orientation relative to the keyboard 110 to permit the camera to be aimed at central, left and right observation zones as respectively indicated, directionwise, by the dashed arrows 114, 116 and 118 in FIG. 7.

The foregoing detailed description is to be clearly understood as being given by way of illustration and example only, the spirit and scope of the present invention being limited solely by the appended claims.

What is claimed is:

1. Computer apparatus comprising:
a keyboard having a top side portion and an observation zone positioned upwardly adjacent and extending along said top side portion;
a video camera positioned to monitor said observation zone; and
control circuitry, associated with said video camera and operative, in response to detection by said video camera of a control movement of a predetermined object through said observation zone, to create a control signal useable to move a cursor on a display screen in a manner corresponding to the detected control movement.

2. The computer apparatus of claim 1 wherein said keyboard is a portable computer keyboard.

3. The computer apparatus of claim 1 wherein said keyboard is a desktop computer system keyboard.

4. The computer apparatus of claim 1 wherein said predetermined object is a hand of a user of said computer apparatus.

5. The computer apparatus of claim 1 wherein:
said object is selectively changeable to a plurality of different configurations, and
said control circuitry is further operative to differentiate between said different configurations of said object within said observation zone and alter said control signal in different manners correlated to each configuration.

6. The computer apparatus of claim 5 wherein said control circuitry is operative to alter said control signal in a manner switching said computer apparatus from a keyboard typing mode to a cursor control mode in response to the presence of said object in a cursor control activation configuration thereof in said observation zone.

7. The computer apparatus of claim 5 wherein said control circuitry is operative to alter said control signal in a manner using said cursor to select an area of said screen in response to the presence of said object in a pick configuration thereof in said observation zone.

8. The computer apparatus of claim 5 wherein said control circuitry is operative to alter said control signal in a manner switching said computer apparatus from a cursor control mode to a keyboard typing mode in response to the presence of said object in a deactivating configuration thereof in said observation zone.

9. The computer apparatus of claim 5 wherein said control circuitry is operative to alter said control signal in a manner switching said computer apparatus from a cursor control mode to a keyboard typing mode in response to the withdrawal of said object from said observation zone.

10. Computer apparatus comprising:
a keyboard;
a screen upon which a movable cursor may be displayed;
a video camera operable to monitor an observation zone; and
control circuitry associated with said video camera and operative in response to detection by said video camera of a control movement of a predetermined object through said observation zone, to create a control signal and use said control signal to move said cursor on said screen in a manner corresponding to the detected control movement, said computer apparatus being a portable computer having a base housing on which said keyboard is carried, and a lid housing on which said screen is carried, said lid housing being supported on said base housing for movement relative thereto between open and closed positions, said video camera being carried by said lid housing and being operable to monitor said observation zone when said lid housing is in said open position thereof, and said observation zone being adjacent said keyboard.

11. The computer apparatus of claim 10 wherein said predetermined object is a hand of a user of said computer apparatus.

12. The computer apparatus of claim 10 wherein said observation zone is disposed generally above said keyboard.

13. The computer apparatus of claim 10 wherein said observation zone is horizontally offset from said base housing.

14. The computer apparatus of claim 10 wherein said video camera is supported on said lid housing for movement relative thereto in a manner selectively shifting said observation zone among (1) a central position disposed generally above said keyboard, (2) a left position leftwardly offset from said keyboard as viewed from the front thereof, and (3) a right position rightwardly offset from said keyboard as viewed from the front thereof.

15. The computer apparatus of claim 10 wherein:

said object is selectively changeable to a plurality of different configurations, and said control circuitry is further operative to differentiate between said different configurations of said object within said observation zone and alter said control signal in different manners correlated to each configuration.

16. The computer apparatus of claim 10 wherein said control circuitry is operative to alter said control signal in a manner switching said computer apparatus from a keyboard typing mode to a cursor control mode in response to the presence of said object in a cursor control activation configuration thereof in said observation zone.

17. The computer apparatus of claim 10 wherein said control circuitry is operative to alter said control signal in a manner using said cursor to select an area of said screen in response to the presence of said object in a pick configuration thereof in said observation zone.

18. The computer apparatus of claim 10 wherein said control circuitry is operative to alter said control signal in a manner switching said computer apparatus from a cursor control mode to a keyboard typing mode in response to the presence of said object in a deactivating configuration thereof in said observation zone.

19. The computer apparatus of claim 10 wherein said control circuitry is operative to alter said control signal in a manner switching said computer apparatus from a cursor control mode to a keyboard typing mode in response to the withdrawal of said object from said observation zone.

20. The computer apparatus of claim 10 wherein said keyboard is a desktop computer system keyboard.

21. The computer apparatus of claim 20 wherein said video camera is supported on said keyboard in an elevated position relative thereto.

22. Computer apparatus comprising:

a keyboard having a top side portion and an observation zone positioned upwardly adjacent and extending along said top side portion;

a screen upon which a movable cursor may be displayed; and cursor control means for receiving three dimensional images of an object moving through said observation zone and utilizing the received images to move said cursor along said screen in a manner correlated to the movement of the object through said observation zone.

23. The computer apparatus of claim 22 wherein said cursor control means include a video camera.

24. The computer apparatus of claim 22 wherein said cursor control means are further operative to differentiate different configurations of the object within the observation zone and responsively provide a plurality of different cursor control functions each keyed to a different one of said configurations.

25. The computer apparatus of claim 24 wherein said cursor control means include a video camera.

* * * * *